United States Patent
Komemushi et al.

(10) Patent No.: US 10,039,272 B2
(45) Date of Patent: Aug. 7, 2018

(54) SPOOL BRAKE DEVICE FOR DUAL-BEARING REEL

(71) Applicant: Shimano Inc., Sakai, Osaka (JP)

(72) Inventors: Takashi Komemushi, Osaka (JP); Akira Niitsuma, Osaka (JP); Yuichiro Ishikawa, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 367 days.

(21) Appl. No.: 15/139,854

(22) Filed: Apr. 27, 2016

(65) Prior Publication Data

US 2017/0013819 A1    Jan. 19, 2017

(30) Foreign Application Priority Data

Jul. 13, 2015   (JP) .................. 2015-139861

(51) Int. Cl.
*A01K 89/01*     (2006.01)
*A01K 89/0155*   (2006.01)

(52) U.S. Cl.
CPC .............. *A01K 89/01555* (2013.01)

(58) Field of Classification Search
CPC .............. A01K 89/01555; A01K 89/02; H04L 2463/121
See application file for complete search history.

(56) References Cited

U.S. PATENT DOCUMENTS

| | | | | |
|---|---|---|---|---|
| 5,749,533 A * | 5/1998 | Daniels | ............ | A01K 89/01555 188/268 |
| 6,045,076 A * | 4/2000 | Daniels | ............ | A01K 89/01555 188/268 |
| 6,412,722 B1 * | 7/2002 | Kreuser | ............ | A01K 89/01555 242/288 |
| 9,957,142 B2 * | 5/2018 | Klinke | .................. | B63B 27/08 |
| 2008/0017739 A1 * | 1/2008 | Beckham | ............ | A01K 89/0155 242/288 |
| 2009/0095835 A1 * | 4/2009 | Beckham | ............ | A01K 89/0155 242/286 |
| 2017/0172130 A1 * | 6/2017 | Komemushi | .... | A01K 89/01557 |
| 2017/0208788 A1 * | 7/2017 | Numata | ............ | A01K 89/01555 |

FOREIGN PATENT DOCUMENTS

JP         H11332436 A      12/1999

* cited by examiner

*Primary Examiner* — Emmanuel M Marcelo
(74) *Attorney, Agent, or Firm* — United IP Counselors, LLC

(57) ABSTRACT

A spool brake device for a fishing reel includes a velocity detector, a spool controller and a spool brake. The velocity detector is configured to detect a rotational velocity of a spool. The spool controller includes an acceleration generator, an acceleration determiner and a brake time predictor. The accelerator generator is configured to generate time-series data of a rotational acceleration based on the rotational velocity. The acceleration determiner is configured to determine whether the rotational acceleration has satisfied a predetermined condition based on the time-series data of the rotational acceleration. The brake time predictor is configured to set a prediction starting time based on a point of time at which the rotational acceleration has satisfied the predetermined condition and to predict a brake starting time of the spool based on the prediction starting time. The spool brake is configured to start braking the spool at the brake starting time.

20 Claims, 6 Drawing Sheets

SPOOL BRAKE DEVICE FOR DUAL-BEARING REEL

CROSS-REFERENCE TO RELATED APPLICATIONS

This application claims priority to Japanese Patent Application No. 2015-139861, filed on Jul. 13, 2015, the entirety of which is hereby incorporated by reference in its entirety.

BACKGROUND

Technical Field

The present disclosure relates to a spool brake device for a fishing reel.

Background Art

To prevent an occurrence of a backlash in casting, some dual-bearing reels are provided with a spool brake device for braking a spool (Japan Laid-open Patent Application Publication No. H11-332436). This type of spool brake device includes, for instance, a spool brake and a rotational velocity detection device (velocity detector). The spool brake includes a magnet mounted to a spool and one or more coils mounted to a reel unit. The rotational velocity detection device is configured to detect the rotational velocity of the spool. In the spool brake device, the rotational velocity detection device monitors the rotational velocity of the spool and detects the maximum value of the rotational velocity of the spool. When the maximum value of the rotational velocity of the spool is herein detected, the spool brake brakes the spool such that a braking force acting thereon gradually increases, whereby the occurrence of backlash is prevented.

As described above, the well-known spool brake device monitors the rotational velocity of the spool in order to detect the maximum value of the rotational velocity of the spool. However, the rotational velocity of the spool often becomes unstable in a velocity range around the maximum value. Hence, it is difficult to accurately detect the maximum value of the rotational velocity of the spool and the timing that the rotational velocity is maximized. In other words, there has been a drawback of difficulty in appropriately braking the spool.

BRIEF SUMMARY

The present disclosure has been produced in view of the aforementioned drawback. It is an object of the present disclosure to provide a spool brake device for a fishing reel whereby a spool can be appropriately braked.

A spool brake device for a fishing reel according to an aspect of the present disclosure includes a velocity detector, a spool controller and a spool brake. The velocity detector detects a rotational velocity of a spool. The spool controller includes an acceleration generator, an acceleration determiner and a brake time predictor. The accelerator generator generates time-series data of a rotational acceleration based on the rotational velocity of the spool. The acceleration determiner determines whether the rotational acceleration has satisfied a predetermined condition based on the time-series data of the rotational acceleration. The brake time predictor sets a prediction starting time based on a point of time at which the rotational acceleration has satisfied the predetermined condition. Additionally, the brake time predictor predicts a brake starting time of the spool based on the prediction starting time. The spool brake starts braking the spool at the brake starting time.

In the present spool brake device, the prediction starting time is set based on the point of time at which the rotational acceleration has satisfied the predetermined condition. Additionally, the brake starting time of the spool is predicted based on the prediction starting time, and braking of the spool is started at the brake starting time.

According to the present spool brake device, a braking of the spool is performed using the rotational acceleration of the spool. Hence, the spool can be appropriately braked in comparison with a well-known spool braking using the rotational velocity of the spool. Additionally, according to the present spool brake device, the prediction starting time is set before starting a braking of the spool, and the brake starting time of the spool is predicted based on the prediction starting time. Hence, a braking of the spool can be reliably started.

In a spool brake device according to another aspect of the present disclosure, the acceleration determiner can determine whether the rotational acceleration has become a predetermined value or less based on the time-series data of the rotational acceleration. The brake time predictor herein can set the prediction starting time based on the point of time at which the rotational acceleration has become the predetermined value or less.

In this case, the prediction starting time can be set with a simple configuration to set the rotational acceleration to be a predetermined value in accordance with applications of the fishing reel.

A spool brake device according to yet another aspect of the present disclosure can further include a maximum acceleration detector. The maximum acceleration detector detects a maximum value of the rotational acceleration in the time-series data of the rotational acceleration. The acceleration determiner herein can determine whether the rotational acceleration has become the predetermined value or less based on the maximum value of the rotational acceleration.

In this case, it is determined whether the rotational acceleration has become the predetermined value or less based on the maximum value of the rotational acceleration. Accordingly, it is possible to monitor a reduction in a rotational acceleration with respect to the maximum value of the rotational acceleration. Hence, the prediction starting time can be accurately set.

In a spool brake device according to yet another further aspect of the present disclosure, the acceleration determiner can start determining whether the rotational acceleration has become the predetermined value or less at a point of time at which the maximum value of the rotational acceleration has been detected.

In this case, the aforementioned determination is started at the point of time at which the maximum value of the rotational acceleration has been detected. In other words, the aforementioned determination is not performed until the maximum value of the rotational acceleration is detected. Hence, the rotational acceleration can be efficiently determined.

In a spool brake device according to yet another further aspect of the present disclosure, the brake time predictor can set a period of time between the prediction starting time and the brake starting time to be a predetermined value.

In this case, the brake starting time can be easily set by setting the period of time between the prediction starting time and the brake starting time to be a predetermined value in accordance with applications of the fishing reel.

In a spool brake device according to yet another further aspect of the present disclosure, the brake time predictor can set a period of time between the prediction starting time and the brake starting time based on the time-series data of the rotational acceleration.

In this case, the period of time between the prediction starting time and the brake starting time is set based on the time-series data of the rotational acceleration in accordance with applications of the fishing reel. Specifically, the period of time between the prediction starting time and the brake starting time is set by a calculation formula using the time-series data of the rotational acceleration. Accordingly, the brake starting time can be easily and accurately set.

Overall, the spool brake device for a fishing reel according to the present disclosure can appropriately brake the spool.

BRIEF DESCRIPTION OF THE DRAWINGS

Referring now to the attached drawings which form a part of this original disclosure.

DETAILED DESCRIPTION OF EMBODIMENTS

<Basic Construction of Reel>

Figure 1:
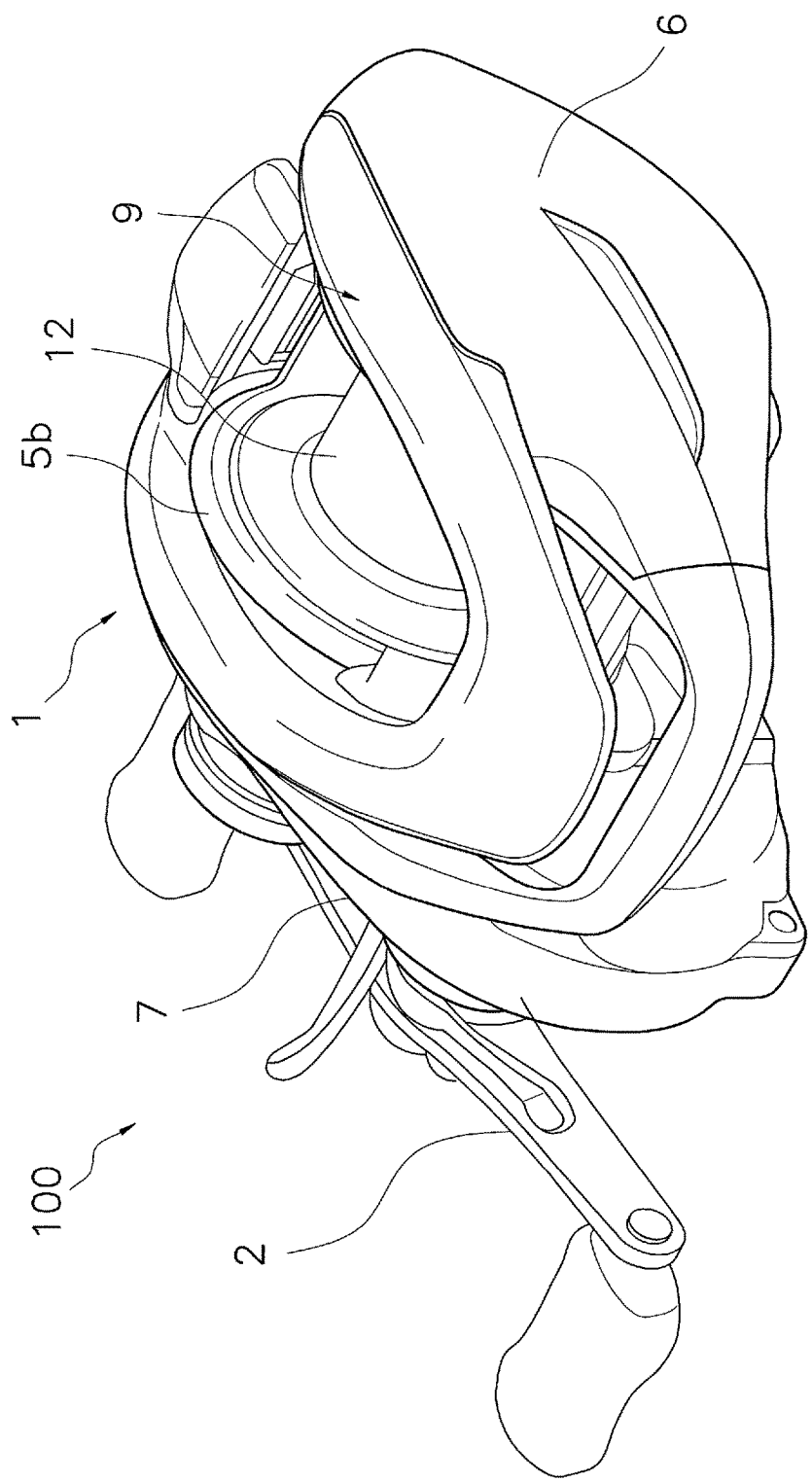
FIG. 1 is a perspective view of a dual-bearing reel employing a preferred embodiment of the present disclosure.
Figure 2:
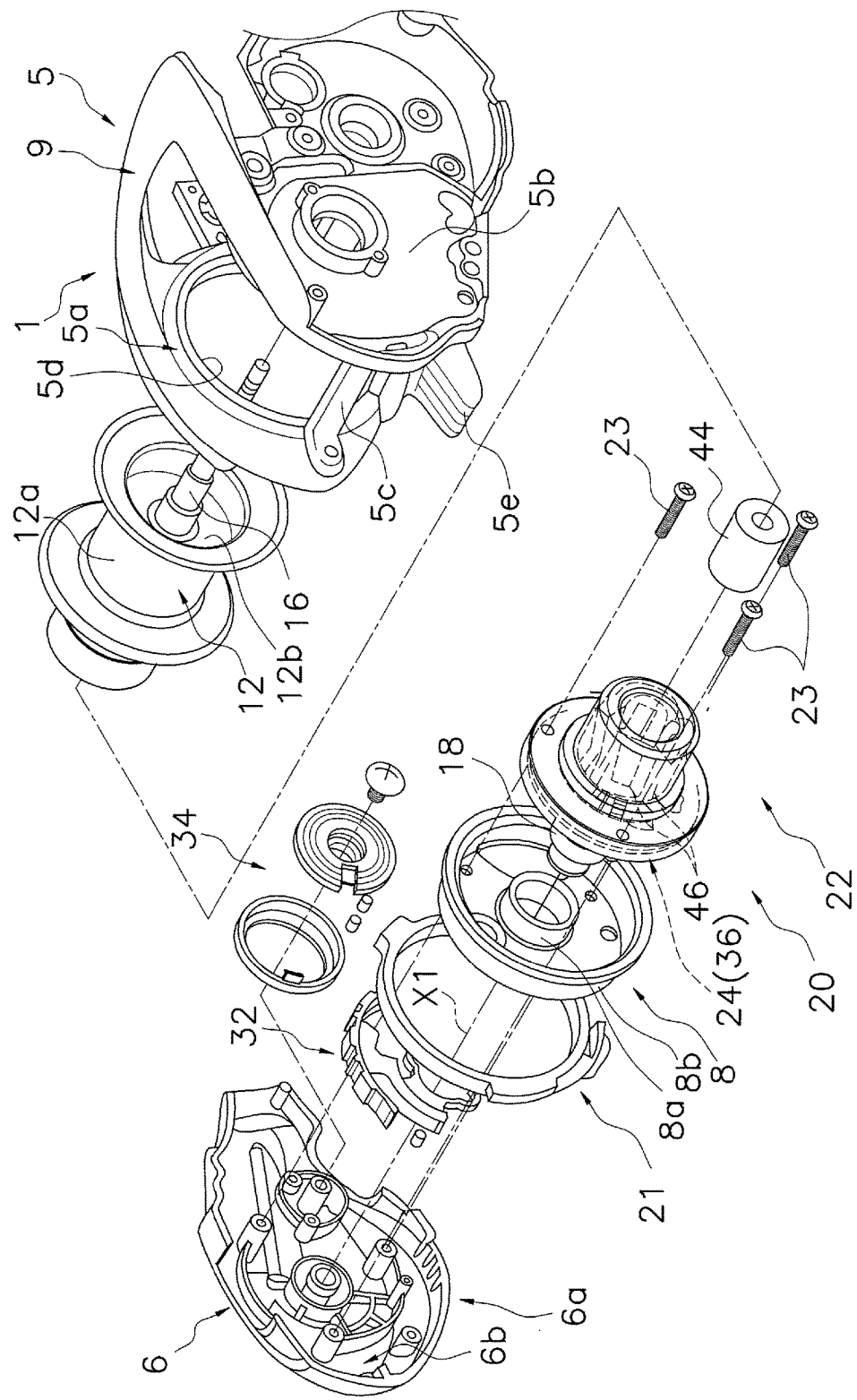
FIG. 2 is an exploded perspective view of the dual bearing reel including a spool brake mechanism.

As shown in FIGS. 1 and 2, a dual-bearing reel 100 employing a preferred embodiment of the present disclosure includes a reel unit 1, a handle 2, a spool 12 and a spool brake mechanism 20 (see FIG. 2) configured to electrically brake the spool 12. The spool brake mechanism 20 is an exemplary spool brake device for the dual-bearing reel 100. It should be noted that in FIG. 2, reference sign X1 indicates the rotational axis of the spool 12.

The reel unit 1 includes a frame 5, a first side cover 6 and a second side cover 7. The frame 5 is an integrally formed component. The first side cover 6 is disposed laterally to the frame 5 on the opposite side of the handle 2. The second side cover 7 is disposed laterally to the frame 5 on the same side as the handle 2.

As shown in FIG. 2, the frame 5 includes a first side plate 5a, a second side plate 5b, a plurality of coupling portions 5c and a thumb rest 9. The first side plate 5a is disposed on the opposite side of the handle 2. The second side plate 5b is opposed to the first side plate 5a. The coupling portions 5c couple the first side plate 5a and the second side plate 5b. The thumb rest 9 is integrated with the first side plate 5a and the second side plate 5b.

The first side plate 5a includes a circular opening 5d enabling the spool 12 to pass therethrough. Among the plural coupling portions 5c, the one coupling the first side plate 5a and the second side plate 5b on the bottom side is provided with a fishing rod attachment leg 5e to be attached to a fishing rod. The spool brake mechanism 20 is detachably mounted to the opening 5d provided in the first side plate 5a of the frame 5.

The first side cover 6 is detachably mounted to the first side plate 5a of the frame 5. The first side cover 6 includes a cover body 6a and a shaft support portion 8 mounted to an inner surface 6b of the cover body 6a.

The cover body 6a is disposed to be contactable with the thumb rest 9. The shaft support portion 8 is fixed to the inner surface 6b of the cover body 6a. Additionally, a first selector 32 (to be described) and a second selector 34 (to be described) of the spool brake mechanism 20 are rotatably mounted to the inner surface 6b.

The shaft support portion 8 is fixed to the first side cover 6 together with part of the constituent elements of the spool brake mechanism 20 by a plurality of (e.g., three) bolt members 23. One end of a spool shaft 16 of the spool 12 is rotatably supported by the shaft support portion 8. The shaft support portion 8 has a bearing accommodation part 8a made in the shape of a tubular protrusion. The aforementioned one end of the spool shaft 16 is rotatably supported by the bearing accommodation part 8a.

An attachment/detachment ring 21 is rotatably mounted to an outer peripheral surface 8b of the shaft support portion 8. The attachment/detachment ring 21 enables the shaft support portion 8 to be attached/detached to/from a position about the opening 5d on the first side plate 5a. In the condition that the shaft support portion 8 is fixed to the first side cover 6, the attachment/detachment ring 21 is restricted from moving in a spool shaft direction and is rotatable with respect to the shaft support portion 8.

The handle 2 is rotatably supported by the reel unit 1. The spool 12 is rotatably held by the reel unit 1 while being disposed between the first side plate 5a and the second side plate 5b. Rotation of the handle 2 is transmitted to the spool 12 through a rotation transmission mechanism (not shown in the drawings).

As shown in FIG. 2, the spool 12 includes a bobbin trunk 12a and a tubular part 12b. The bobbin trunk 12a is capable of winding a fishing line thereabout. The tubular part 12b is integrated with the bobbin trunk 12a and is fixed onto the spool shaft 16. The spool shaft 16 is coupled to the inner peripheral surface of the tubular part 12b in a unitarily rotatable state. The aforementioned one end of the spool shaft 16 is rotatably supported by the shaft support portion 8 through a bearing 18. The other end of the spool shaft 16 is rotatably supported by the second side cover 7 through a bearing (not shown in the drawings).

<Construction of Spool Brake Mechanism>

Figure 4:
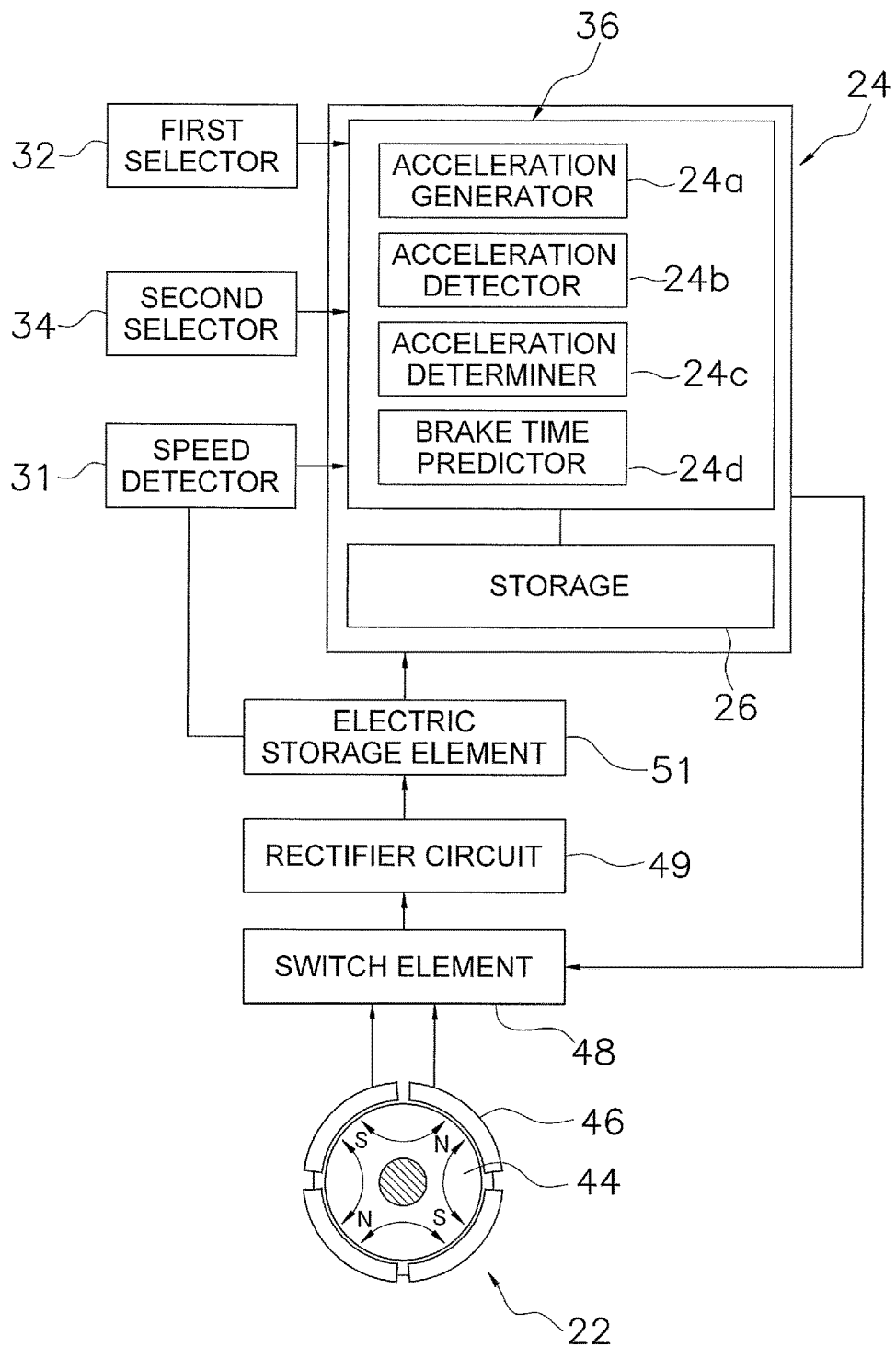
FIG. 4 is a block diagram of the spool brake mechanism.

As shown in FIG. 4, the spool brake mechanism 20 includes a speed detector 31, a spool brake unit 22 (exemplary spool brake) and a spool control unit 24 (exemplary spool controller) for controlling the spool brake unit 22.

(Speed Detector)

As shown in FIG. 4, the speed detector 31 is configured to detect a rotational velocity ω of the spool 12. Specifically, the speed detector 31 is configured to detect the rotational velocity ω of the spool 12 and the rotational direction of the spool 12 by a variation in a magnetic flux of a brake magnet 44 (to be described). The rotational velocity ω of the spool 12 and the rotational direction of the spool 12, both of which are herein detected, are configured to be recorded in a storage 26 (to be described) of the spool control unit 24.

Figure 3:
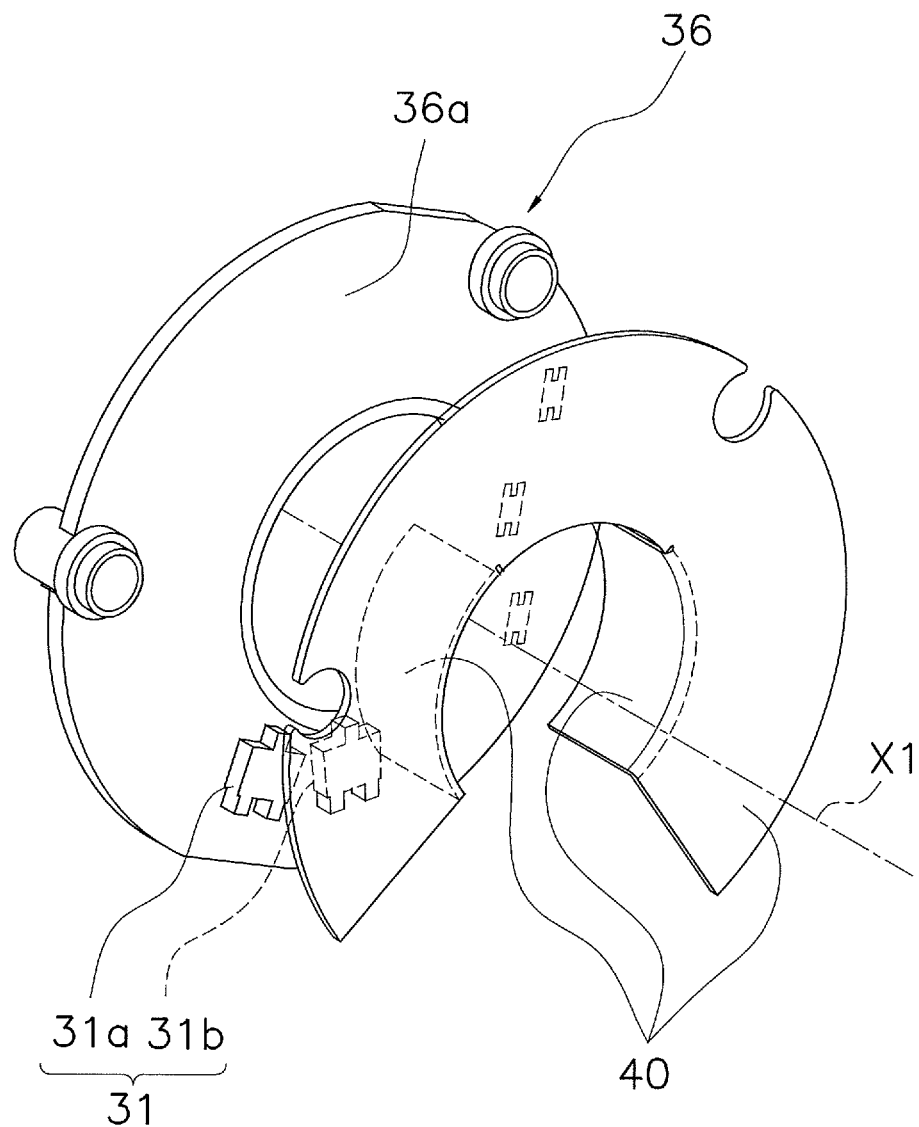
FIG. 3 is an exploded perspective view of a circuit board.

As shown in FIG. 3, the speed detector 31 includes two hall elements 31a and 31b. The hall elements 31a and 31b are mounted to the inner peripheral region of a lateral surface of a circuit board 36 (to be described) of the spool control unit 24, while being arranged about the rotational axis X1 at an interval. Additionally, the hall elements 31a and 31b are opposed to the brake magnet 44 on the outer peripheral side of the brake magnet 44, and are configured to detect the rotational velocity ω of the spool 12 and the rotational direction of the spool 12 (see FIG. 2).

(Spool Brake Unit)

As shown in FIGS. 2 and 4, the spool brake unit 22 is configured to brake the spool 12. The spool brake unit 22 includes the brake magnet 44 mounted to the spool 12 in a unitarily rotatable state, a plurality of coils 46 connected in series, a switch element 48, an electric storage element 51, the first selector 32 and the second selector 34.

The brake magnet 44 is mounted to the spool shaft 16 in a unitarily rotatable state. In the present preferred embodiment, the brake magnet 44 is bonded to the spool shaft 16. The brake magnet 44 is a cylindrical magnet magnetized to have magnetic anisotropy.

The plural (e.g., four) coils 46 are attached to the circuit board 36 (to be described). The plural coils 46 are disposed on the outer peripheral side of the brake magnet 44 while being aligned at predetermined intervals in a tubular arrangement. Wires of the coils 46 are respectively wound in a roughly rectangular shape. The wound wires are opposed to the brake magnet 44 while being disposed within the magnetic field of the brake magnet 44. Both ends of the plural coils 46 connected in series are electrically connected to the switch element 48 mounted to the circuit board 36. It should be noted that coreless coils are herein used as the coils 46 for preventing cogging in order to smoothly rotate the spool 12. Moreover, the coils 46 are not provided with any yoke.

The switch element 48 is formed by, for instance, a field effect transistor. The switch element 48 is connected to the electric storage element 51 through a rectifier circuit 49. A duty cycle is changed by switching on and off the switch element 48, and the spool 12 is braked accordingly. For example, a braking force acting on the spool 12 is strengthened with an increase in a length of time that the switch element 48 is switched on (i.e., with an increase in a magnitude of a duty cycle).

The electric storage element 51 is configured to store electric power generated by the coils 46 in a casting. The electric storage element 51 is configured to supply electric power to electric components such as the spool control unit 24. The electric storage element 51 is formed by, for instance, an electrolytic capacitor.

The first selector 32 is configured to set a reference tension in accordance with the types of fishing line. Specifically, by turning the first selector 32, any one of a plurality of tension setting modes is configured to be selected in accordance with types of fishing line (e.g., nylon line, fluorocarbon line (polyvinylidene fluoride line), and PE line (polyethylene fiber thread)).

The second selector 34 is configured to regulate the braking force to be applied to the spool 12 in accordance with the mass of a terminal tackle, the condition of a fishing site, and so forth. Specifically, the second selector 34 is configured to select any one of a plurality of (e.g., five) brake modes in accordance with the mass of a terminal tackle, the condition of a fishing site, and so forth. How the braking force acts on the spool 12 is determined by the brake mode herein selected.

(Spool Brake Unit)

Figure 5:
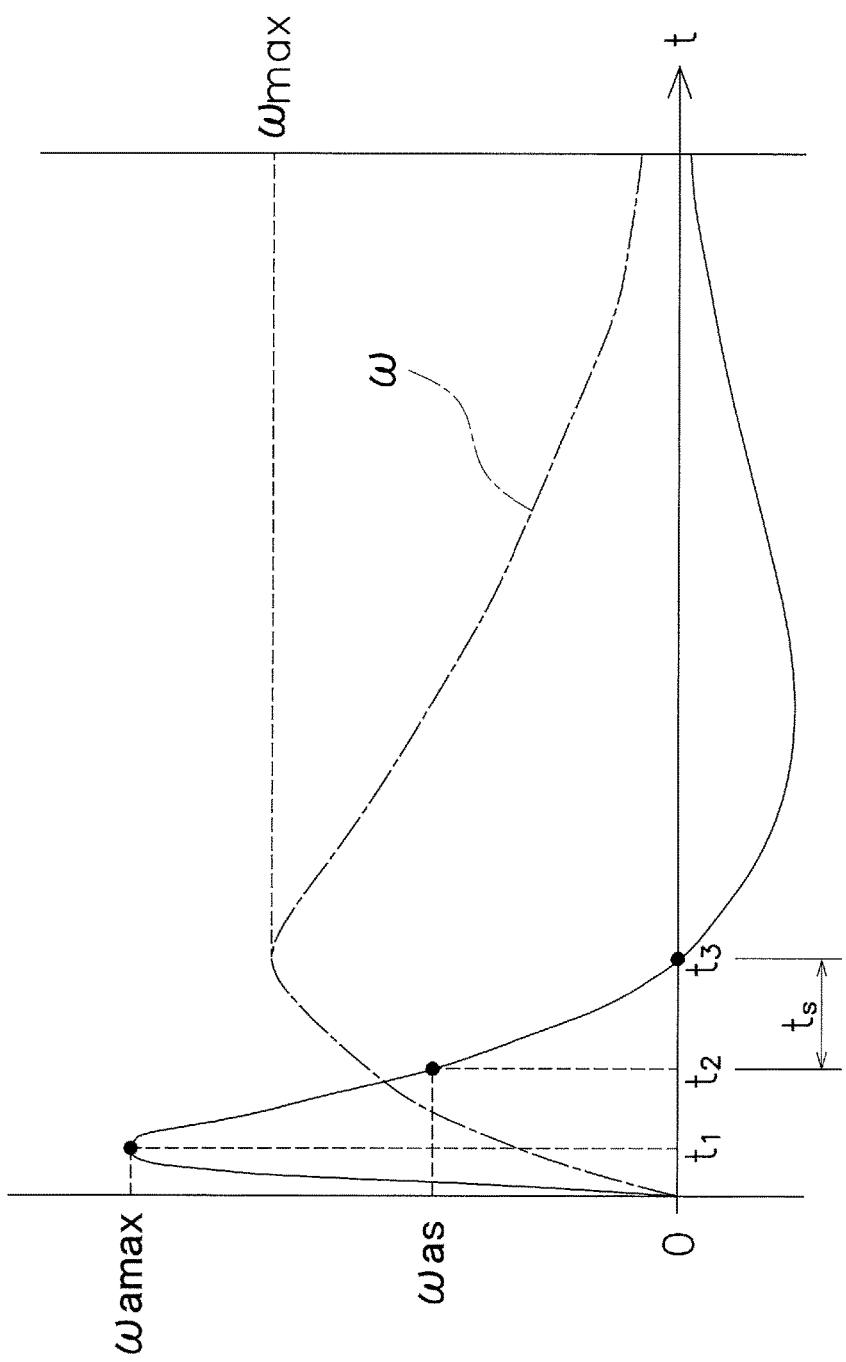
FIG. 5 is a chart for explaining a brake action of a spool control unit.

As shown in FIGS. 3 to 5, the spool control unit 24 includes the circuit board 36 and the storage 26.

As shown in FIG. 3, the circuit board 36 is made in a annular shape. The circuit board 36 is mounted to one of the surfaces of the shaft support portion 8, i.e., the surface opposed to the spool 12, and is disposed on the outer peripheral side of the bearing accommodation part 8a. The circuit board 36 includes a lateral surface 36a to which the coils 46 are mounted. The circuit board 36 is fixed to the first side cover 6 together with the shaft support portion 8, a cover member and a magnetic flux shield member 40 by the bolt members 23.

The circuit board 36 is formed by a microcomputer including a ROM, a RAM and a CPU. The ROM can be a read-only memory, a programmable read-only memory (PROM), an erasable programmable read-only memory (EPROM), a flash memory, or any other type of read-only memory. The RAM can be a static random-access memory (SRAM), a dynamic random-access memory (DRAM), or any other type of random-access memory. The CPU can be any processing device, such as a programmable logic device, a digital signal processor (DSP), or a microprocessor. In one implementation, the microcomputer is implemented by a system on chip (SoC). In the circuit board 36, the CPU is configured to execute a variety of processing using data recorded in the ROM. Additionally, the CPU is configured to execute a variety of processing by recording data in the RAM and using the data recorded in the RAM on an as-needed basis. It should be noted that the variety of processing includes data recognition processing, data computation processing, data determination processing, and/or so forth. The CPU is an example of a processing means.

The storage 26 is formed by a non-volatile memory such as an electrically erasable programmable read-only memory (EEPROM) or a flash memory. The storage 26 can also be implemented with a ferroelectric RAM, a magnetoresistive RAM, or a phase-change RAM. The non-volatile memory is capable of storing data recorded in the RAM. Additionally, the non-volatile memory is capable of storing data under the variety of processing. The storage 26 is an example of a storing means. The storage 26, the ROM, the RAM, and a cache in the CPU are also examples of non-transitory media. Non-transitory media can store transitory media such as software and signals.

The spool control unit 24 has functions shown in FIG. 4. The spool control unit 24 includes an acceleration generator 24a, a maximum acceleration detector 24b, an acceleration determiner 24c and a brake time predictor 24d. The processing for implementing these functions is executed by the CPU, the ROM and/or the RAM of the circuit board 36. Now, FIG. 5 is a chart schematically showing a time-series variation in parameters to be used in the aforementioned processing. It should be noted that the data related to the variety of processing can be recorded in and read out from the storage 26 on an as-needed basis.

The acceleration generator 24a is configured to generate time-series data of a rotational acceleration ωa based on the rotational velocity ω of the spool 12 detected by the speed detector 31. Specifically, the speed detector 31 is configured to detect the rotational velocity ω of the spool 12 at predetermined time intervals (e.g., at a predetermined frame rate). Then, the acceleration generator 24a is configured to generate time-series data of the rotational acceleration ωa using the rotational velocity ω of the spool 12 and the predetermined time intervals.

The maximum acceleration detector 24b is configured to detect a maximum value ωamax of the rotational acceleration ωa (hereinafter referred to as "maximum rotational acceleration ωamax") in the time-series data of the rotational acceleration ωa. Specifically, the maximum acceleration detector 24b is configured to monitor the time-series data of the rotational acceleration ω at predetermined time intervals (e.g., at a predetermined frame rate) and to detect the maximum rotational acceleration ωamax. It should be noted that, in general, the maximum rotational acceleration ωamax occurs in the beginning of the action of the spool 12.

The acceleration determiner 24c is configured to determine whether or not the rotational acceleration ωa has reached a predetermined value ωas or less (exemplary predetermined condition) based on the time-series data of the rotational acceleration ωa. When described in detail, the acceleration determiner 24c is configured to start a determination processing at time t1 at which the maximum rotational acceleration ωamax has been detected. Then, the acceleration determiner 24c is configured to determine whether or not the rotational acceleration ωa has reached the predetermined value ωas or less based on the time-series data of the rotational acceleration ωa and the maximum rotational acceleration ωamax.

Specifically, when the time-series data of the rotational acceleration ωa has been detected as described above, the time-series data of the rotational acceleration ωa is divided by the maximum rotational acceleration ωamax and is corrected. Then, it is determined whether or not the rotational acceleration ωa with respect to the maximum rotational acceleration ωamax (i.e., a rotational acceleration ratio (ωa/ωamax)) has become a predetermined value (ωas/ωamax) or less based on the corrected time-series data of the rotational acceleration ωa.

The brake time predictor 24d is configured to set a prediction starting time t2 based on a point of time at which the rotational acceleration ωa has become the predetermined value ωas or less. Then, the brake time predictor 24d is configured to predict a time t3 at which the spool 12 starts being braked based on the prediction starting time t2.

Specifically, the prediction starting time t2 is set to be a point of time at which the rotational acceleration ratio (ωa/ωamax) has become the predetermined value (ωas/ωamax) or less. Then, the brake starting time t3 at which the spool 12 starts being braked is set to be a point of time at which a predetermined period of time is has elapsed from the prediction starting time t2. When it becomes the brake starting time t3 at which the spool 12 starts being braked, the spool brake unit 22 starts braking the spool 12.

<Action of Spool Brake Mechanism>

Figure 6:
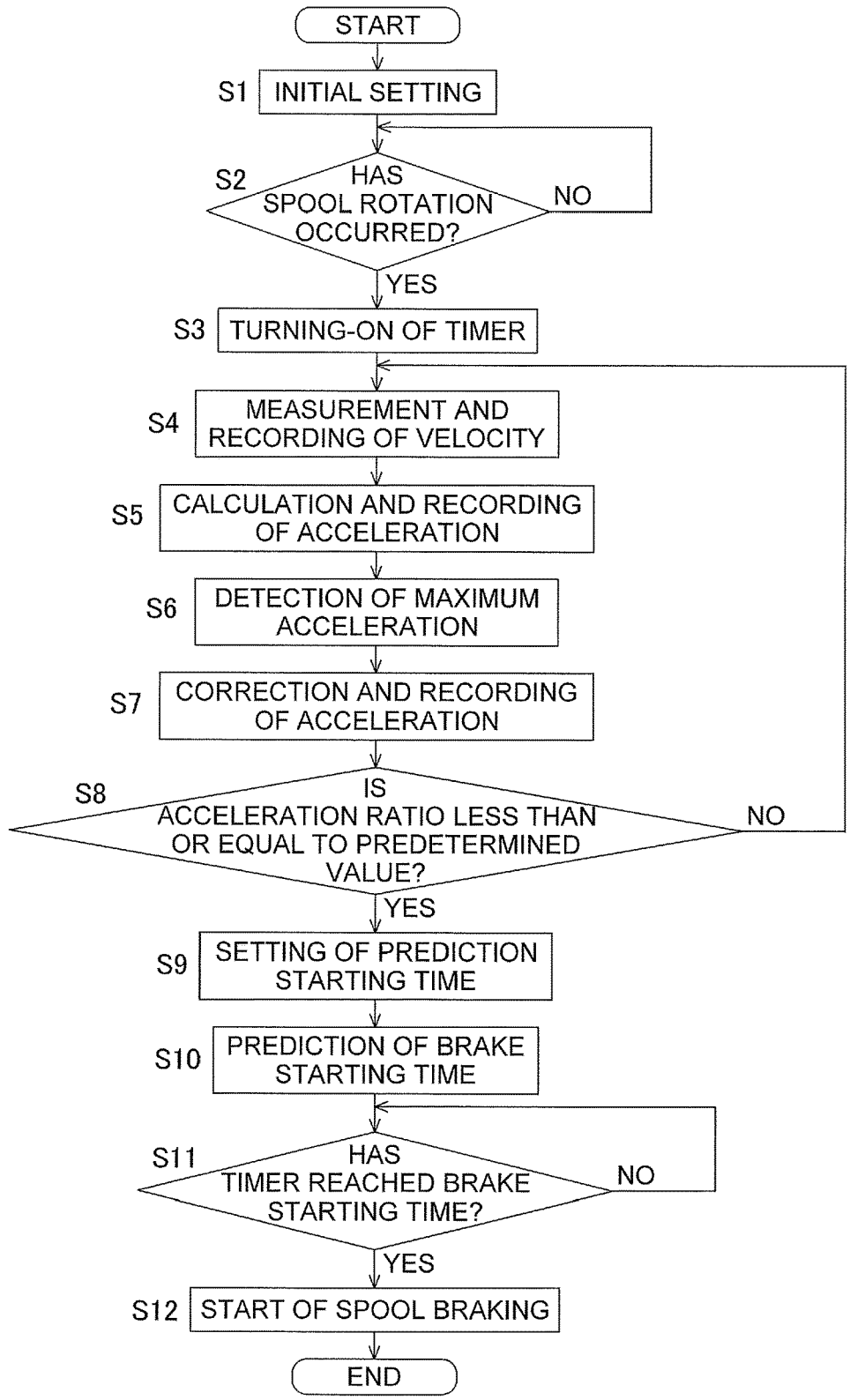
FIG. 6 is a flowchart showing an exemplary control processing of the spool control unit.

Next, a spool brake action will be explained based on the flowchart shown in FIG. 6. It should be noted that the control flowchart shown in FIG. 6 is an exemplary control action, and the control action of the present disclosure is not limited to this.

First, when the spool 12 is rotated by a casting, electric power is stored in the electric storage element 51. Accordingly, the spool control unit 24 is powered on, and an initial setting is performed (51). In the initial setting, a variety of items (flag, timer, data, etc.) are reset. The initial setting includes a recognition of the tension setting mode and that of the brake mode.

Next, it is determined whether or not the spool 12 has been rotated (S2). When the speed detector 31 has herein detected the rotational velocity ω of the spool 12 (Yes in S2), it is determined that the spool 12 has been rotated. When the speed detector 31 has not detected the rotational velocity ω of the spool 12 yet (No in S2), it is determined that the spool 12 has not been rotated yet. Accordingly, a rotation of the spool 12 is continuously monitored until the speed detector 31 detects the rotational velocity ω of the spool 12.

Next, when it is determined that the spool 12 has been rotated (Yes in S2), a timer for counting a rotational time tk is turned on (S3). The rotational time tk is a period of time from a starting of a rotation of the spool 12. Then, the speed detector 31 detects the rotational velocity ω of the spool 12 at a predetermined frame rate (of, e.g., 1/60 frames per second). The rotational velocity ω of the spool 12, detected herein, is then recorded in the storage 26. Accordingly, the time-series data of the rotational velocity ω of the spool 12 is generated (S4) thereby.

Additionally, the rotational acceleration ωa of the spool 12 is herein calculated by dividing a difference between values of the rotational velocity ω of the spool 12 at two adjacent points of time on the time axis by the aforementioned time interval. The rotational acceleration ωa of the spool 12, calculated herein, is then recorded in the storage 26. Accordingly, the time-series data of the rotational acceleration ωa of the spool 12 is generated (S5) thereby.

Next, the rotational acceleration ωa of the spool 12 is monitored at the predetermined frame rate, and the maximum rotational acceleration ωamax is detected (S6). When the spool 12 herein starts being rotated by a casting, the rotational acceleration ωa increases every frame. When the rotational acceleration ωa then decreases, the value of the rotational acceleration ωa at a frame immediately before the frame that the rotational acceleration ωa has decreased is detected as the maximum rotational acceleration ωamax. Accordingly, the processing of the next step (S7) is started.

Next, the time-series data of the rotational acceleration ωa is corrected using the maximum rotational acceleration ωamax (S7). A value of the rotational acceleration ωa at every frame is herein divided by the maximum rotational acceleration ωamax. Thus, the time-series data of the rotational acceleration ωa is corrected, and the corrected time-series data of the rotational acceleration ωa is recorded in the storage 26. It should be noted that the corrected time-series data of the rotational acceleration ωa is time-series data of a rotational acceleration ratio (ωa/ωamax: a ratio of the rotational acceleration ωa to the maximum rotational acceleration ωamax).

Next, it is determined whether or not the rotational acceleration ratio (ωa/ωamax) has become the predetermined value (ωas/ωamax) or less from time t1 at which the maximum rotational acceleration ωamax has been detected based on the corrected time-series data of the rotational acceleration ωa (the time-series data of the rotational acceleration ratio) (S8). This determination is performed at the predetermined frame rate.

The predetermined value (ωas/ωamax) of the rotational acceleration ratio (ωa/ωamax) is herein recorded in, for instance, the ROM of the circuit board 36, and is set to be, for instance, 0.08. It should be noted that FIG. 5 is a schematic chart for easy explanation, and therefore, the predetermined value ωas of the rotational acceleration ωa is not plotted as a value by which the predetermined value (ωas/ωamax) of the rotational acceleration ratio (ωa/ωamax) is set to be "0.08".

When the rotational acceleration ratio (ωa/ωamax) has herein become the predetermined value (ωas/ωamax) or less (Yes in S8), a point of time in the rotational time tk at this frame is set as the prediction starting time t2 of the spool 12 (S9). A point of time, at which the predetermined period of time ts has elapsed from the prediction starting time t2, is then set as the brake starting time t3 of the spool 12 (S 10). The predetermined period of time ts should have a positive, nonzero duration. The period of time ts can be predetermined or determined dynamically. It should be noted that when the rotational acceleration ratio (ωa/ωamax) is greater than the predetermined value (ωas/ωamax) (No in S8), the processing of measurement and recordation of velocity (S4) is performed.

Next, it is determined whether or not the rotational time tk has reached the brake starting time t3 (S11). When the rotational time tk has herein reached the brake starting time t3 (Yes in S11), the spool brake unit 22 starts braking the spool 12 (S12). On the other hand, when the rotational time tk has not reached the brake starting time t3 yet (No in S11), the rotational time tk is monitored until the rotational time tk reaches the brake starting time t3.

<Comprehensive Explanation>

The aforementioned preferred embodiment can be expressed as follows.

(1) The present spool brake mechanism 20 includes the speed detector 31, the spool control unit 24 and the spool brake unit 22. The speed detector 31 is configured to detect the rotational velocity ω of the spool 12. The spool control unit 24 includes the acceleration generator 24a, the acceleration determiner 24c and the brake time predictor 24d. The acceleration generator 24a is configured to generate the time-series data of the rotational acceleration ωa based on the rotational velocity ω of the spool 12. The acceleration determiner 24c is configured to determine whether or not the rotational acceleration ωa has satisfied a predetermined condition based on the time-series data of the rotational acceleration ωa. The brake time predictor 24d is configured to set the prediction starting time t2 based on a point of time at which the rotational acceleration ωa has satisfied the predetermined condition. Additionally, the brake time predictor 24d is configured to predict the brake starting time t3 of the spool 12 based on the prediction starting time t2. The spool brake unit 22 is configured to start braking the spool 12 at the brake starting time t3.

In the present spool brake mechanism 20, the prediction starting time t2 is set based on the point of time at which the rotational acceleration ωa has satisfied the predetermined condition. Additionally, the brake starting time t3 of the spool 12 is predicted based on the prediction starting time t2, and a braking of the spool 12 is started at the brake starting time t3.

According to the present spool brake mechanism 20, a braking of the spool 12 is performed using the rotational acceleration ωa of the spool 12. Hence, the spool 12 can be appropriately braked in comparison with a well-known spool braking using only the rotational velocity of the spool. Additionally, according to the present spool brake mechanism 20, the prediction starting time t2 is set before starting a braking of the spool 12, and the brake starting time t3 of the spool 12 is predicted based on the prediction starting time t2. Hence, braking of the spool 12 can be reliably started.

(2) In the present spool brake mechanism 20, the acceleration determiner 24c can determine whether or not the rotational acceleration ωa has become the predetermined value ωas or less based on the time-series data of the rotational acceleration ωa. The brake time predictor 24d herein can set the prediction starting time t2 based on the point of time at which the rotational acceleration ωa has become the predetermined value ωas or less.

In this case, the prediction starting time t2 can be set with a simple configuration to set the predetermined value ωas in accordance with applications of the fishing reel.

(3) The present spool brake mechanism 20 can further include the maximum acceleration detector 24b. The maximum acceleration detector 24b detects the maximum value ωamax of the rotational acceleration ωa in the time-series data of the rotational acceleration ωa. The acceleration determiner 24c herein can determine whether or not the rotational acceleration ωa has become the predetermined value ωas or less based on the maximum value ωamax of the rotational acceleration ωa.

In this case, it is determined whether or not the rotational acceleration ωa has become the predetermined value ωas or less based on the maximum value ωamax of the rotational acceleration ωa. Accordingly, it is possible to monitor a reduction in a rotational acceleration with respect to the maximum value ωamax of the rotational acceleration ωa. Hence, the prediction starting time t2 can be accurately set.

(4) In the present spool brake mechanism 20, the acceleration determiner 24c can start determining whether or not the rotational acceleration ωa has become the predetermined value ωas or less from the time t1 at which the maximum value ωamax of the rotational acceleration ωa has been detected.

In this case, the aforementioned determination is started at the time t1 at which the maximum value ωamax of the rotational acceleration ωa has been detected. In other words, the aforementioned determination is not performed until the maximum value ωamax of the rotational acceleration ωa is detected. Hence, the rotational acceleration ωa can be efficiently determined.

(5) In the present spool brake mechanism 20, the brake time predictor 24d can set the period of time between the prediction starting time t2 and the brake starting time t3 to be the predetermined value ts.

In this case, the brake starting time t3 can be easily set by setting the period of time between the prediction starting time t2 and the brake starting time t3 to be the predetermined value ts in accordance with applications of the fishing reel.

<Other Preferred Embodiments>

One preferred embodiment of the present invention has been explained above. However, the present invention is not limited to the above, and a variety of changes can be made without departing from the scope of the present invention. Especially, a plurality of preferred embodiments and modifications described in the present specification can be arbitrarily combined on an as-needed basis.

(a) The aforementioned preferred embodiment has described the spool brake unit configured to brake the spool by an electric power generation. However, the spool brake unit can be arbitrarily constructed as long as it is electrically controllable. For example, the spool brake unit can have a construction that an electrically controllable actuator causes brake shoes or brake pads to make contact with a drum or a disc.

(b) The aforementioned preferred embodiment has exemplified a case that the period of time between the prediction starting time t2 and the brake starting time t3 is set to be a predetermined value. Instead of this, the period of time between the prediction starting time t2 and the brake starting time t3 can be set based on the time-series data of the rotational acceleration ωa. In this case, for instance, the value is of the period of time between the prediction starting time t2 and the brake starting time t3 is calculated by an n-th polynomial (n: positive integer) using the rotational acceleration contained in the time-series data of the rotational acceleration ωa as a parameter. Accordingly, the brake starting time t3 can be easily and accurately set.

(c) The aforementioned preferred embodiment has exemplified a case that the rotational acceleration ratio (ωa/ωamax) is used in the form of time-series data. However, the rotational acceleration ωa can be used in the form of time-series data.

What is claimed is:

1. A spool brake device for a fishing reel, comprising:
a velocity detector configured to detect a rotational velocity of a spool;
a spool controller including an acceleration generator, an acceleration determiner and a brake time predictor,
the acceleration generator configured to generate time-series data of a rotational acceleration based on the rotational velocity,
the acceleration determiner configured to determine whether the rotational acceleration has satisfied a predetermined condition based on the time-series data of the rotational acceleration,
the brake time predictor configured to set a prediction starting time based on a point of time at which the rotational acceleration has satisfied the predetermined condition and to predict a brake starting time of the spool based on the prediction starting time; and
a spool brake configured to start braking the spool at the brake starting time.

2. The spool brake device according to claim 1, wherein
the acceleration determiner is configured to determine whether the rotational acceleration has become a predetermined value or less based on the time-series data of the rotational acceleration, and
the brake time predictor is configured to set the prediction starting time based on a point of time at which the rotational acceleration has become the predetermined value or less.

3. The spool brake device according to claim 2, further comprising:
a maximum acceleration detector configured to detect a maximum value of the rotational acceleration in the time-series data of the rotational acceleration, wherein
the acceleration determiner is configured to determine whether the rotational acceleration has become the predetermined value or less based on the maximum value of the rotational acceleration.

4. The spool brake device according to claim 3, wherein the acceleration determiner is configured to start determining whether the rotational acceleration has become the predetermined value or less at a point of time at which the maximum value of the rotational acceleration has been detected.

5. The spool brake device according to claim 1, wherein the brake time predictor is configured to set a period of time between the prediction starting time and the brake starting time to be a predetermined value.

6. The spool brake device according to claim 1, wherein the brake time predictor is configured to set a period of time between the prediction starting time and the brake starting time based on the time-series data of the rotational acceleration.

7. The spool brake device according to claim 1, wherein the acceleration determiner determines whether a rotational acceleration ratio has become a predetermined value or less.

8. A method implemented by a spool brake device for a fishing reel, the method comprising:
detecting a rotational velocity of a spool;
generating time-series data of a rotational acceleration based on the rotational velocity;
determining whether the rotational acceleration has satisfied a predetermined condition based on the time-series data of the rotational acceleration;
setting a prediction starting time based on a point of time at which the rotational acceleration has satisfied the predetermined condition;
predicting a brake starting time of the spool based on the prediction starting time; and
starting a braking of the spool at the brake starting time.

9. The method according to claim 8, further comprising:
determining whether the rotational acceleration has become a predetermined value or less based on the time-series data of the rotational acceleration; and
setting the prediction starting time based on a point of time at which the rotational acceleration has become the predetermined value or less.

10. The method according to claim 9, further comprising:
detecting a maximum value of the rotational acceleration in the time-series data of the rotational acceleration; and
determining whether the rotational acceleration has become the predetermined value or less based on the maximum value of the rotational acceleration.

11. The method according to claim 10, further comprising:
starting determining whether the rotational acceleration has become the predetermined value or less at a point of time at which the maximum value of the rotational acceleration has been detected.

12. The method according to claim 8, further comprising:
setting a period of time between the prediction starting time and the brake starting time to be a predetermined value.

13. The method according to claim 8, further comprising:
setting a period of time between the prediction starting time and the brake starting time based on the time-series data of the rotational acceleration.

14. A non-transitory, computer-readable medium encoded with instructions that, when executed by a processor, cause the processor to perform a method comprising:
detecting a rotational velocity of a spool;
generating time-series data of a rotational acceleration based on the rotational velocity;
determining whether the rotational acceleration has satisfied a predetermined condition based on the time-series data of the rotational acceleration;
setting a prediction starting time based on a point of time at which the rotational acceleration has satisfied the predetermined condition;
predicting a brake starting time of the spool based on the prediction starting time; and
starting a braking of the spool at the brake starting time.

15. The medium according to claim 14, the method further comprising:
determining whether the rotational acceleration has become a predetermined value or less based on the time-series data of the rotational acceleration; and
setting the prediction starting time based on a point of time at which the rotational acceleration has become the predetermined value or less.

16. The medium according to claim 15, the method further comprising:
detecting a maximum value of the rotational acceleration in the time-series data of the rotational acceleration; and
determining whether the rotational acceleration has become the predetermined value or less based on the maximum value of the rotational acceleration.

17. The medium according to claim 16, the method further comprising:
starting determining whether the rotational acceleration has become the predetermined value or less at a point of time at which the maximum value of the rotational acceleration has been detected.

18. The medium according to claim 14, the method further comprising:
    setting a period of time between the prediction starting time and the brake starting time to be a predetermined value.

19. The medium according to claim 14, the method further comprising:
    setting a period of time between the prediction starting time and the brake starting time based on the time-series data of the rotational acceleration.

20. The medium according to claim 14, the method further comprising:
    determining whether a rotational acceleration ratio has become a predetermined value or less.

* * * * *